United States Patent [19]
Igarashi et al.

[11] Patent Number: 5,235,327
[45] Date of Patent: Aug. 10, 1993

[54] PAGING DEVICE WITH TEST AND SCAN MODES

[75] Inventors: Kazuyuki Igarashi; Toru Karasawa, both of Suwa, Japan

[73] Assignee: Seiko Epson Corporation, Tokyo, Japan

[21] Appl. No.: 708,587

[22] Filed: May 31, 1991

[30] Foreign Application Priority Data

| Jun. 1, 1990 | [JP] | Japan | 2-143568 |
| Jun. 1, 1990 | [JP] | Japan | 2-143569 |
| Jun. 1, 1990 | [JP] | Japan | 2-143570 |
| Jun. 12, 1990 | [JP] | Japan | 2-153372 |
| May 23, 1991 | [JP] | Japan | 3-118618 |

[51] Int. Cl.$^5$ .................. G05B 23/02; G08B 5/22; H04Q 1/30
[52] U.S. Cl. .................. 340/825.07; 340/825.44; 340/311.1; 455/166.1; 455/343
[58] Field of Search .......... 340/825.44, 825.07, 340/311.1, 825.47, 825.48; 455/71, 151.2, 166.1, 166.2, 161.1, 226.1, 226.2, 226.3, 226.4, 343

[56] References Cited

U.S. PATENT DOCUMENTS

| 4,063,179 | 12/1977 | Brown | 455/166.1 |
| 4,479,125 | 10/1984 | Mori | 340/825.44 |
| 4,649,538 | 3/1987 | DeLuca et al. | 340/825.44 |
| 4,720,710 | 1/1988 | Akohori et al. | 340/825.44 |
| 4,978,944 | 12/1990 | Andros et al. | 455/71 |
| 5,095,308 | 3/1992 | Hewitt | 340/825.44 |
| 5,121,408 | 6/1992 | Cai et al. | 455/71 |

FOREIGN PATENT DOCUMENTS

63-158924 7/1988 Japan .

Primary Examiner—Donald J. Yusko
Assistant Examiner—R. Gray
Attorney, Agent, or Firm—Blum Kaplan

[57] ABSTRACT

A paging device for receiving information and including a test mode for determining the receiving characteristics of the device and a scan mode for scanning a frequency range within which the information exists in determining the frequency of the information. A receiver within the device for receiving information at a receiving frequency can be set at different receiving frequencies. A control unit sets the receiving frequency during the test mode to a predefined test frequency. The predefined test frequency is determined by the control unit without the device entering the scan mode.

67 Claims, 5 Drawing Sheets

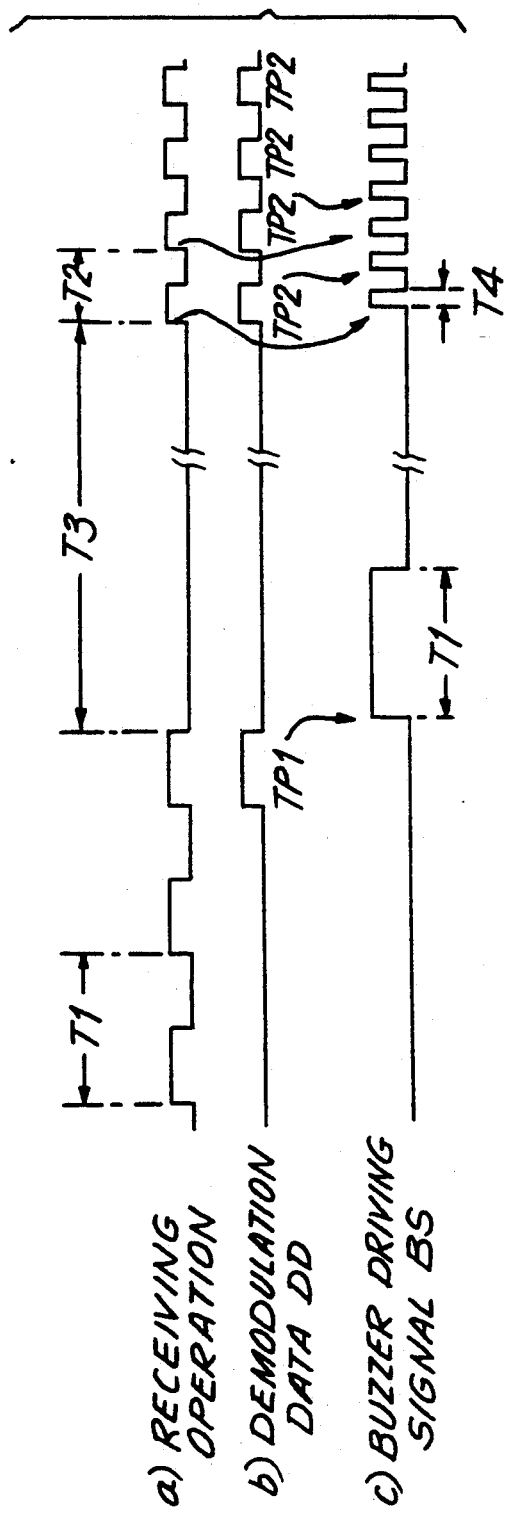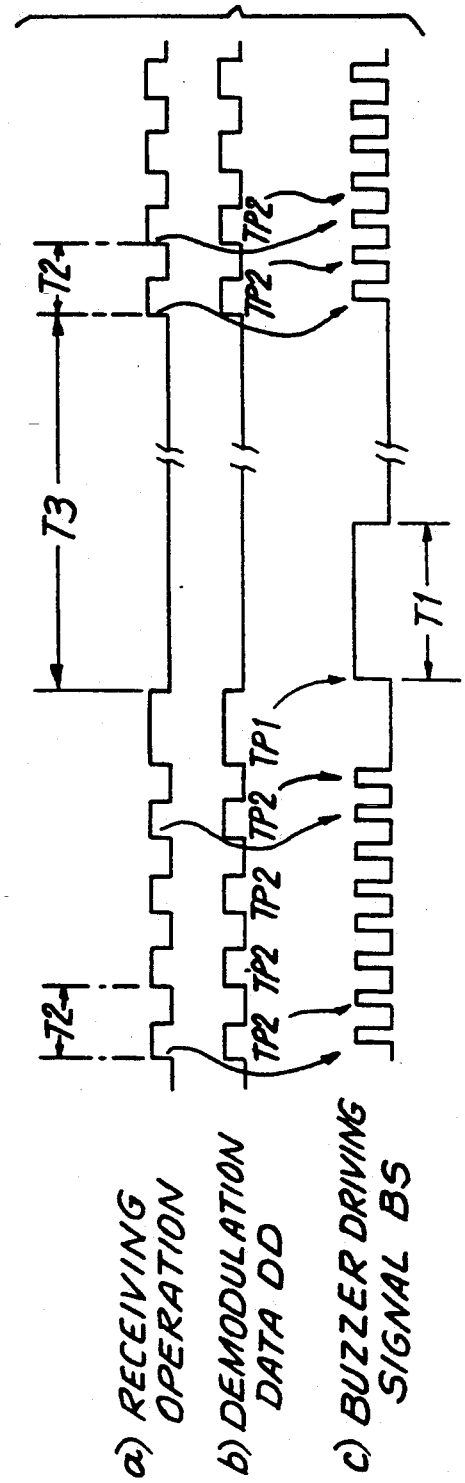

PAGING DEVICE WITH TEST AND SCAN MODES

BACKGROUND OF THE INVENTION

This invention relates generally to a receiver for paging through audio and displayed messages and in particular, to a paging receiver which includes a power saving mode operation during testing of the receiver.

Conventional paging receivers, such as disclosed in Japanese Patent Laid-Open Publication 63-158924, receive paging information (messages) using radio waves with a sub-carrier frequency ranging between about 87.6 to 108.0 MHz, that is, within the normal FM radio band broadcasting frequencies. Each receiver includes a scan mode for automatically scanning the FM frequency band to determine the broadcast frequency at which the paging information is being transmitted by, for example, a message service.

The paging receiver must be capable of providing an error-free (i.e. reliable) message under a variety of conditions at all times. To ensure that the paging receiver provides such reliable service, during the final stage of manufacture, the receiving characteristics of the paging receiver are tested. The test measures the receiving characteristic of the receiving circuit based on the computer instructions and data stored in each receiver. Adjustments to the receiver are performed, as required, based on the measured receiving characteristics.

In conducting the receiving characteristic test, the receiver initially enters a scan mode which scans a predetermined frequency band to identify the predetermined frequency at which the paging message is being transmitted. The messages are transmitted by a wireless transmitter. Such scanning must be repeated each time a receiving characteristic test is performed. The receiving characteristics must be retested for each change in environmental conditions. An inefficient, time consuming and labor intensive testing procedure results. Accompanying adjustments (i.e. adjusting works) to the receiver, as required, based on the measured receiving characteristics, aggravates and further increases the labor and time required in testing and correcting the receiver.

The need during such testing for the internal battery of the receiver to power the receiver as though the latter were under normal operating conditions and the frequent neglect to shut off the receiver as soon as possible once testing has been completed, needlessly consumes the useful life of the internal battery.

It is therefore desirable to provide a paging receiver which can be tested far more efficiently and quickly. The receiver should also require less power from its internal battery when being tested and should be prevented from needlessly consuming power from its internal battery once the test has been completed.

SUMMARY OF THE INVENTION

Generally speaking, in accordance with the invention a paging device for receiving information includes a test mode and a scanning mode. The test mode determines the receiving characteristics of the paging device. The scan mode scans a frequency range within which the information exists in determining the frequency of the information.

During the test mode, an FM receiving circuit receives the information at a receiving frequency. The FM receiving circuit can be set at different receiving frequencies. The device also includes a control unit for setting the receiving frequency of the FM receiving circuit during the test mode to a predefined test frequency.

In setting the receiving frequency to a predefined test frequency, the predefined test frequency is determined by the control means without requiring the paging device to enter the scan mode. Consequently, the paging device can be tested far more efficiently and quickly by eliminating the need to carry out the scan mode to determine the frequency of the information being transmitted during the test mode.

Features of the invention include a wireless transmitter for producing the information and switching circuitry for initiating the test mode. The control unit, in response to the switching circuitry, shifts the FM receiving circuit to the test mode.

The paging device also includes a liquid crystal display (LCD) to display the operation mode of the device.

During the test mode, the information transmitted includes a first test packet provided during a preparatory stage of the test mode and at least one second test packet produced during a main testing stage of the test mode. The first test packet includes frequency data corresponding to the predefined test frequency. A buzzer is provided to indicate reception of a first test packet during the preparatory stage and reception of each second test packet during the main testing stage.

Another feature of the invention includes a storage device for storing identification data for identifying the first test packet and second test packet. The control unit detects the first test packet and second test packet based on the identification data stored in the storage device.

The first test packet includes frequency data corresponding to the predefined test frequency which is processed by the control unit for setting the receiving frequency of the FM receiving circuit to the predefined test frequency. Each second test packet which immediately follows a first test packet is at the predefined test frequency which corresponds to the frequency data of the first test packet.

The control unit is operable for halting operation of the FM receiving circuit for a prefixed period of time during the preparatory stage of the test mode for changing the receiving frequency at which the FM receiving circuit is set. The control unit is also operable for shifting from the main testing stage back to the preparatory stage in response to the control unit detecting the first test packet during the main testing stage. In the event that the first test packet is not detected by the control unit within a preset time interval of the preparatory stage of the test mode, the control unit will halt operation of the FM receiving circuit. Consequently, power consumption of the paging device's internal battery is minimized during the test mode.

The FM receiving circuit is operable during first intermittent time intervals of the preparatory stage and for operating during second intermittent time intervals of the main testing stage wherein each second intermittent time interval is shorter than each first intermittent time interval. Such intermittent time intervals during the preparatory stage and main testing stage conserve the life of the internal battery.

The LCD also displays values representing the receiving characteristics determined during the test mode. More particularly, the values include the number of times that the FM receiving circuit attempts to receive the second test packet and the number of times that the FM receiving circuit actually receives the second test packet during the main testing stage.

Accordingly it is an object of the present invention to provide an improved paging receiver which can be tested far more efficiently and quickly as compared to a conventional paging receiver.

It is a further object of the invention to provide an improved paging receiver which conserves the power consumption requirement of the receiver's internal battery when the receiver is being tested.

It is a further object of the invention to provide an improved paging system that contains an automated test mode so as to reduce the time and labor associated with testing and repairing the system.

Still other objects and advantages of the invention wil in part, be obvious and will, in part, be apparent from the specification.

The invention accordingly comprises the several steps and a relation of one or more such systems with respect to each of the other, and the apparatus embodying the features of construction, combinations of elements, and arrangement of parts which are adapted to effect such steps in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 shows timing charts a, b, and c illustrating operation of the paging system during the preparatory and main testing stages of the test mode in accordance with the invention.

FIG. 5 shows the timing charts a, b, and c illustrating various signals received and produced by the paging system when shifting from a first main testing stage to the next preparatory and main testing stages;

DESCRIPTION OF THE PREFERRED EMBODIMENT

Figure 1:
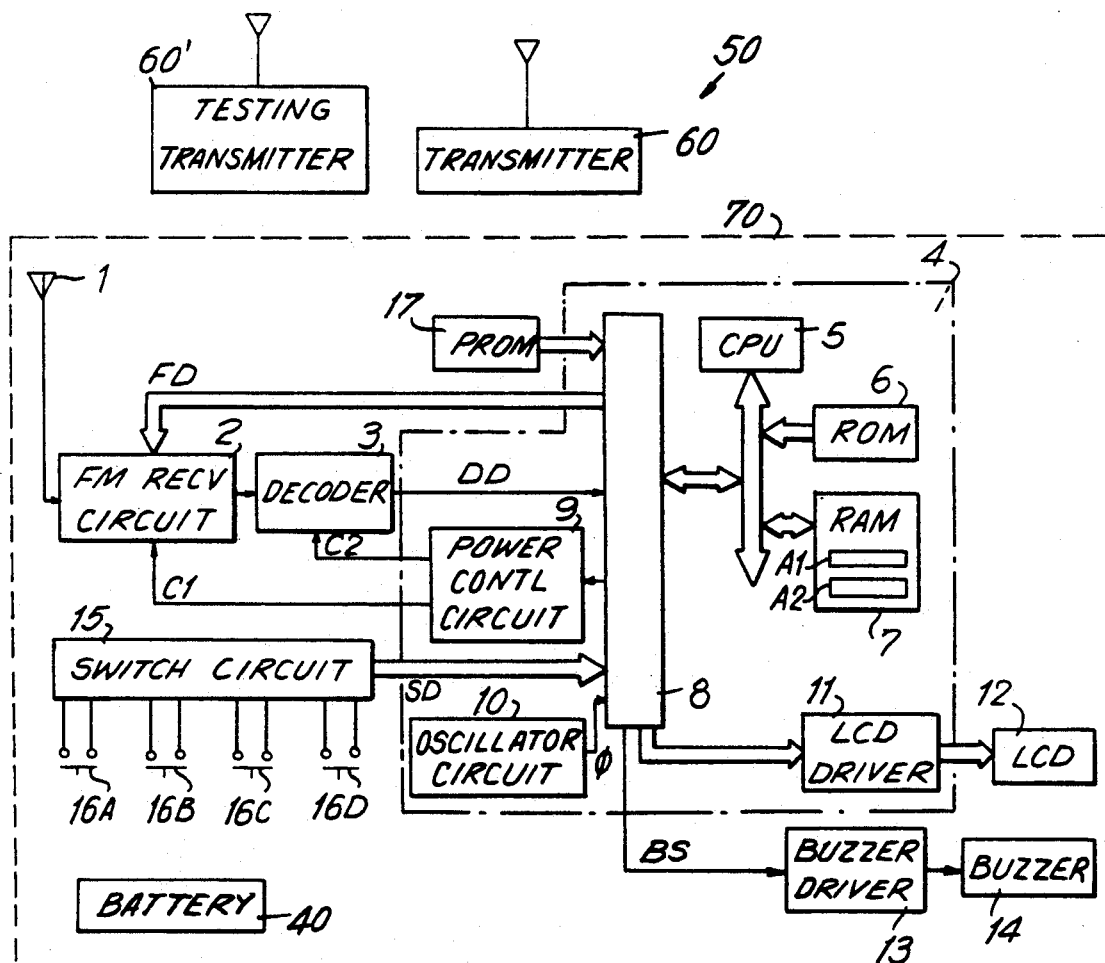
FIG. 1 is a block diagram illustrating the paging system in accordance with the invention.

As shown in FIG. 1, a wireless paging system 50 includes a wireless transmitter 60 and at least one receiver 70. Paging receiver 70 includes an antenna 1 for supplying messages to an FM receiving circuit 2 transmitted by transmitter 60 at FM radio broadcast frequencies. FM receiving circuit 2 employs a suitable, well known digital synthesizer tuner having a phase locked loop (PLL) circuit. The receiving frequency can be set at increments of 0.1 MHz within a range of about 87.6 to 108.0 MHz based on a receiving frequency data signal FD. FM receiving circuit 2 can be operated in one of three different power modes. During the first mode, a power-off mode, the internal power supply (e.g. a battery 40) of receiver 70 is turned off. The internal power supply during the second mode, a power-on mode, is turned on. Receiver 70 is therefore able to receive messages during the power on mode. Receiver 70, during a third mode, a power-saving mode, can not receive any messages from transmitter 60 but can perform a limited number of functions to reduce power consumption requirements of the internal power source. One of the limited functions, as explained in greater detail below, involves setting receiver 70 to a particular frequency for receiving messages provided by transmitter 60 during a test mode.

Switching between power modes is effected by a power supply control signal C1 and a power control signal C2 supplied from a power supply control circuit 9.

An FM base band signal from FM receiving circuit 2 is supplied to a decoder 3. Selective calling (digital) data multiplexed within the FM sub-carrier frequency band is extracted by decoder 3. After being subjected to error correction processing, the digital data is supplied to a controller 4 as demodulation data DD.

Controller 4 includes a single chip microcomputer including a central processing unit (CPU) 5 for controlling the operation of receiver 70 and a read only memory (ROM) 6 for storing programs to be executed by CPU 5 and identification data for identifying a first test packet TP1 and a second test packet TP2 (described below). Controller 4 also includes a random access memory (RAM) 7 for temporarily storing data during execution of a program and an input/output (I/O) circuit 8 connected to CPU 5 through a bus line for transferring various data, receiving data therefrom and supplying later thereto. Power supply control circuit 9 of controller 4 supplies power supply control signal C1 and a power control signal C2 to FM receiving circuit 2 and decoder 3 in accordance with instructions from CPU 5, respectively. An oscillator circuit 10 of controller 4 generates a clock pulse $\phi$ which serves as a reference signal for CPU 5. A liquid crystal display (LCD) driver 11 of controller 4 drives an LCD 12 in accordance with display operating instructions from CPU 5.

Receiver 70 also includes a buzzer driving circuit 13 which drives a buzzer 14 in accordance with a buzzer driving signal BS provided from controller 4. Buzzer 14 generates a warning sound to alert a user as to the status/condition of receiver 70. A switch circuit 15 supplies switch data SD to controller 4. Switch data SD corresponds to the operation of A-switch 16A, a B-switch 16B, a C-switch 16C, and a D-switch 16D. Switch circuit 15 can include more or less switches; each switch preferably being of the push button type. A PROM 17 (programmable ROM) stores a private call number assigned to each receiver of paging system 50.

Test Mode

Paging receiver 70 is typically tested (i.e. placed in a test mode to check its receiving characteristic) during factory shipping inspection. The test mode includes two stages, that is, a preparatory stage and a main testing stage. During the preparatory stage, a first test packet TP1 is transmitted from a testing transmitter 60' (similar to transmitter 60) at a predetermined frequency, for example, of 88.1 MHz (i.e. first test frequency). First test packet TP1 includes frequency data relating to the first test frequency. Based on the frequency data of first test packet TP1, receiver 70 does not need to perform a scanning operation to determine the frequency of the next transmission from testing transmitter 60' but rather is initialized at the first test frequency.

The next transmission, which takes place during the main testing stage, includes a second test packet TP2 which is repeatedly transmitted at fixed intervals at the first test frequency. During the main testing stage, the receiving characteristics at the first test frequency are verified based on the number of times that receiver 70 identifies second test packet TP2 as having been received.

The first test frequency is then changed to a new second test frequency. In changing to the second test frequency, system 50 returns to the preparatory stage followed by the main testing stage. The first test packet TP1 now includes frequency data relating to the second test frequency at which test packet TP2 will be transmitted. By alternately repeating the preparatory stage an main testing stage, the receiving characteristics at respective testing frequencies (first testing frequency, second testing frequency . . . ) can be measured.

Figure 2:
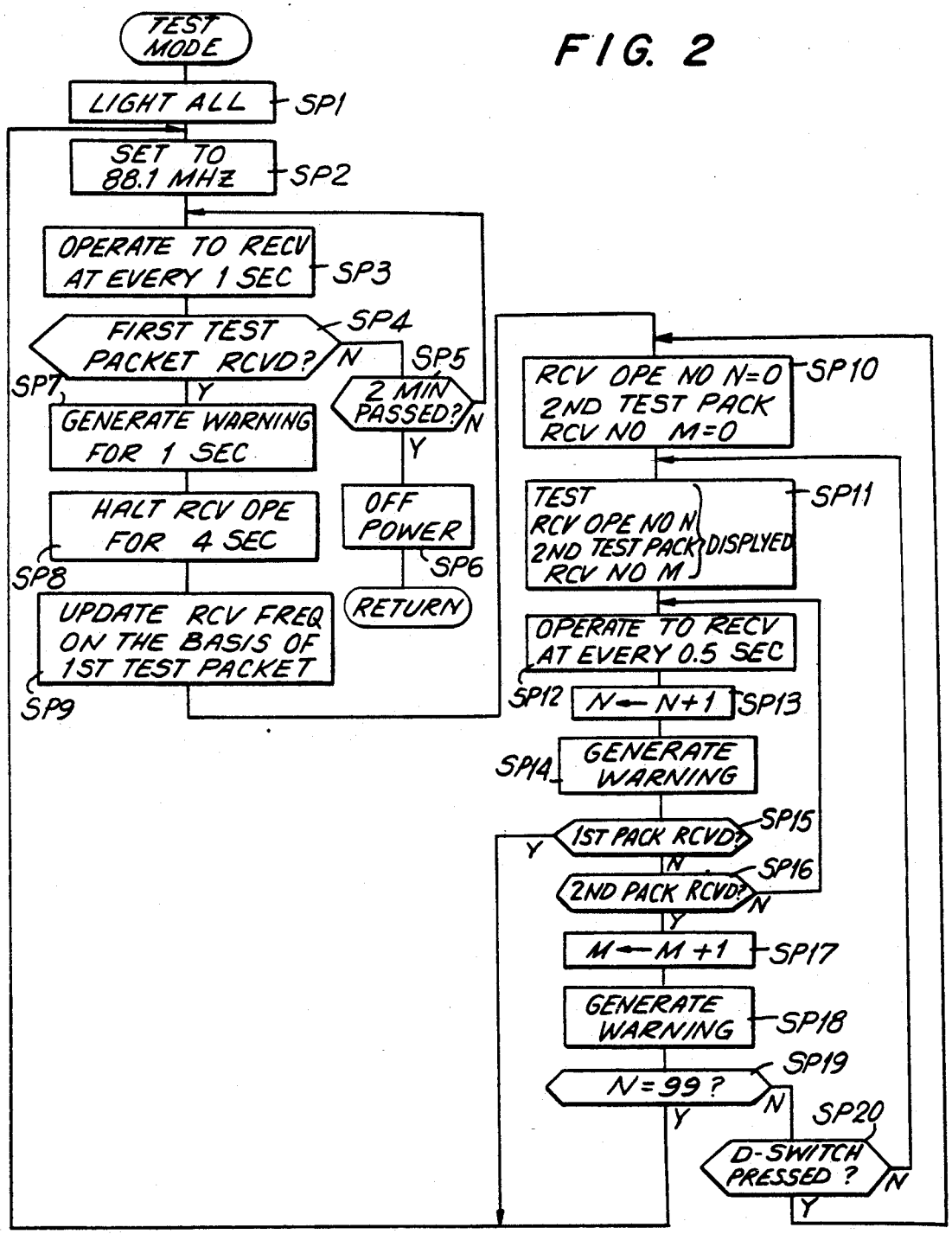
FIG. 2 is a flow chart illustrating operation of the paging system during the test mode.
Figure 6:
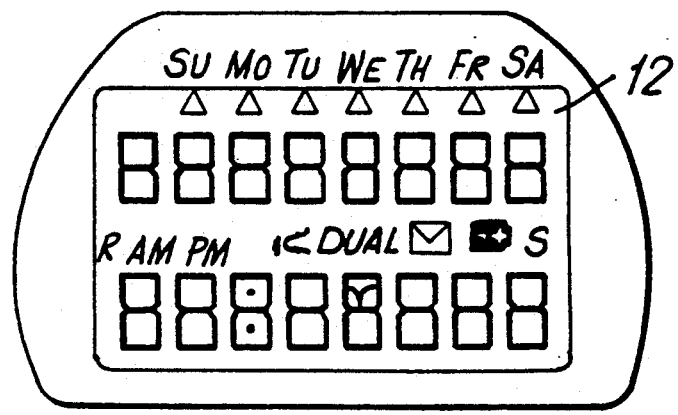
FIG. 6 is a diagrammatic plan view of a liquid crystal display (LCD) during the test mode in accordance with the invention.

Referring now to FIG. 2, when A-switch 16A, B-switch 16B and C-switch 16C are concurrently pressed, a corresponding switch data signal SD is supplied to CPU 5. Upon receiving switch data signal SD, CPU 5 is switched from a receiving mode to a test mode. At step SP1, as shown in FIG. 2, all segments of LCD 12 are lit (see FIG. 6), to indicate that system 50 has entered the test mode. During a next step SP2, frequency data signal FD is supplied to FM receiving circuit 2 to set the receiving frequency to 88.1 MHz (first test frequency). FM receiving circuit 2 now enters a power-saving mode.

At step SP3, CPU 5 instructs power supply control circuit 9 to switch FM receiving circuit 2 from the power-saving mode to the power-on mode preferably for approximately 30–40 msec during a time period T1 preferably equal to 1 second. As shown in FIG. 4(a), during the first two time periods T1, A-switch 16A, B-switch 16B and C-switch 16C have not been turned ON (i.e. switch data signal SD is not supplied to CPU 5). Consequently, no demodulation data signal DD has been produced by decoder 3. When A-switch 16A, B-switch 16B and C-switch 16C are concurrently turned ON, switching circuit 15 produces switching data signal SD. CPU 5 in response to switching data signal SD switches receiver 70 into a test mode. Consequently, demodulation data signal DD is produced by decoder 3 during the third time period T1 of FIG. 4(a). During the 30–40 msec. interval, receiver 70 is able to receive packet TP1. In other words, receiver 70 is intermittently (i.e. for 30–40 msec. of each minute) in a power-on, receiving mode and otherwise is in a power saving mode.

Figure 7:
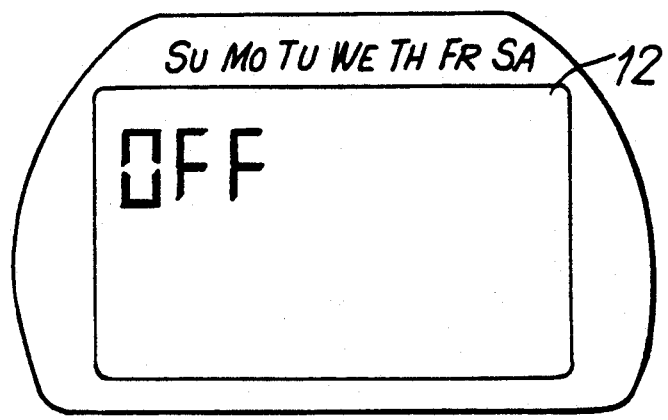
FIG. 7 is a diagrammatic plan view of the LCD during the power-off mode in accordance with the invention.

During step SP4, CPU 5 detects, depending on demodulation data signal DD, whether first test packet TP1 has been received. If first test packet TP1 has not been received, the program stored in ROM 6 directs CPU 5 to proceed to step SP5. During step SP5, CPU 5 determines whether two-minutes have elapsed since initiation of the test mode. If two minutes have not yet elapsed, receiver 70 repeatedly returns to step SP3, that is, continues to be intermittently placed in a power-on mode for receiving first test packet TP1. If first test packet TP1 has not been received after two minutes, the program proceeds to step SP6 at which time FM receiving circuit 2 is switched to the power-off mode. As shown in FIG. 7, the characters "OFF" are now displayed on LCD 12 to reflect the power-off status of receiver 70. By switching to a power-off mode, the energy stored in the internal power source, for example, battery 40 is automatically conserved. Step SP6 prevents receiver 70 from endlessly searching for first test packet TP1 and thereby prevents needlessly consuming and shortening the useful life of battery 40.

If first test packet TP1 has been received during step SP4, under a step SP7, CPU 5 inputs buzzer driving signal BS to buzzer driver 13 for a time period T1 (1 second), as shown in FIG. 4(c), to generate a prolonged warning sound representing reception of first test packet TP1. Under step SP8, FM receiving circuit 2 is placed by CPU 5 in a power-off mode for a time period T3 (e.g. 4 seconds), as shown in FIG. 4(a), to suspend the receiving operation of receiver 70. During period T3, under step SP9, the receiving frequency of FM receiving circuit 2 is updated to (i.e. set at) the first test frequency in preparation for the next transmission (test packet TP2). The preparatory stage is now complete.

Receiver 70 now shifts to a main testing stage during which time second test packet TP2 is repeatedly transmitted at fixed intervals by transmitter 60' at the first test frequency.

During step SP10, CPU 5 resets the count values in a pair of count areas A1 and A2 of RAM 7 for counting a number N of completed receiving operations, and a number M of received second test packets. Under step SP11, the characters "TEST", and count values N and M are displayed on LCD 12.

At step SP12, CPU 5 instructs power supply control circuit 9 to switch FM receiving circuit 2 from the power-saving mode to the power-on mode for a time period of about 30–40 msec every 0.5 seconds. A receiving operation is performed during the 30–40 msec. time interval by FM receiving circuit 2. Each cycle of 0.5 sec. is represented in FIG. 4(a) by a time period T2. During step SP13, count value N (representing the number of receiving operations) is incremented by a value of 1. CPU 5, under step SP14, provides buzzer driving signal BS to buzzer driver 13 for a time period T4 (<T2/2), as shown in FIG. 4(c), to generate a short warning sound representing that a receiving operation has been performed.

Under a step SP15, CPU 5, based on demodulated data signal DD, determines whether a first test packet TP1 has been received. If a first test packet has not been received, under step SP16, CPU 5 determines whether a second test packet TP2 has been received. If a second test packet TP2 has not been received, the program stored in ROM 6 returns CPU 5 to step SP12. If reception of second test packet TP2 has occurred, the program proceeds to a step SP17 At step SP17, the value of count value M (representing the number of received second test packets TP2) is increased by 1.

Under step SP18, CPU 5 provides buzzer driving signal BS to buzzer driver 13 for a time period T4, as shown in FIG. 4(c), to generate a warning sound (a short sound) representing reception of a second test packet TP2. CPU 5 determines under step SP19 whether count value N has reached a value of "99" at which value program returns to step SP2. When the count value is less than "99", under step SP20, CPU 5 determines whether D-switch 16D has been pressed (i.e. turned ON). When D-switch has been pressed, the program returns to step SP10 (i.e. the main testing stage begins again) whereas when D-switch 16D has not been pressed, the program returns to step SP11. Depression of D-switch 16D during the main testing stage resets count values N and M to a value of 0.

By repeating steps SP10–SP20 as described above, the short warning sounds representing that a receiving operation has been performed and the short warning sounds indicating that a second test packet TP2 has been received are alternately generated. Count values M and N are also displayed by LCD 12. When N=99, a shift is made to the preparatory stage for receiving a new first test packet TP1 to be transmitted by the FM transmitting frequency at 88.1 MHz. In the event that another first test packet TP1 is received prior to N=99, receiver 70 shifts back to the preparatory stage to receive a new first test packet TP1 which is typically at a new second test frequency (i.e. the program returns from step SP15 to step SP2).

Referring to FIGS. 5(a), 5(b) and 5(c), a first test packet rather than a second test packet TP2 is received during the main testing stage. A warning sound indicating the fact that a first test packet has been received is produced for a time period T1 (=1 second) under step SP7.

In accordance with the invention, when the testing frequency is to be changed, whether in the preparatory or main testing stages, it is only necessary to transmit from transmitter 60', a new first test packet T1 including the frequency data related to the new frequency (second testing frequency). The receiving characteristics of receiver 60 can be simply and easily tested at different test frequencies(i.e. first test frequency, second test frequency, third testing frequency, etc).

Once the test mode is completed, internal battery 40, under step SP6, is turned OFF. That is, when N=99, the test mode must eventually always reach step SP6.

Receiving Mode

Figure 3:
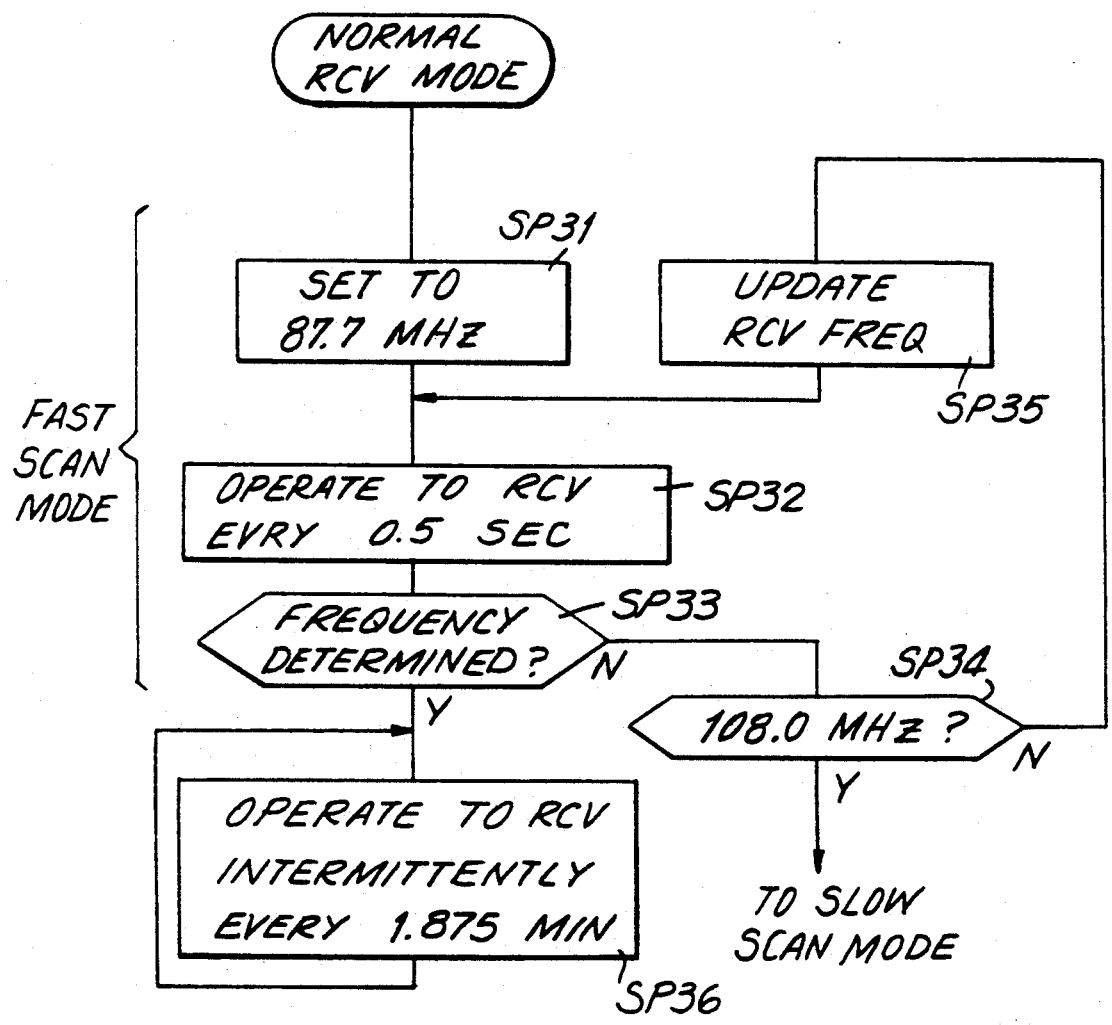
FIG. 3 is a flow chart illustrating operation of the paging system during the receiving mode.

Receiver 70 serves as a paging device once it is switched to its normal receiving mode (i.e. to receive messages from transmitter 0). When shipped from the factory, receiver 70 is preferably in its power-off mode. Receiver 70 can be reset to its power-on mode by changing, for example, internal battery 40. More particularly, CPU 5 executes a fast scan mode through a plurality of steps SP31–SP35 as shown in FIG. 3. First, at step SP31, the receiving frequency of FM receiving circuit 2 is set to 87.7 MHz. At step SP32, an instruction is given to power supply control circuit 9 to switch FM receiving circuit 2 from the power-saving to the power-on mode for a time period of about 30–40 msec every 0.5 seconds, thereby causing FM receiving circuit 2 to intermittently perform the receiving operation. Upon each execution of the receiving operation at step SP32, the program proceeds to the next step SP33, at which CPU 5 determines, based on demodulation data signal DD provided from decoder 3, whether the currently received frequency is the FM broadcast frequency on which the paging message service is transmitting.

In the event that the receiving frequency is not determined at step SP33, CPU 5 proceeds under step SP34 to determine whether the current receiving frequency is 108.0 MHz. If the frequency is not 108.0 MHz, the program proceeds under step SP35 to update the receiving frequency by increasing the receiving frequency of FM receiving circuit 2 by a predetermined incremental value before returning to step SP32. For example, under step SP35, the receiving frequency of FM recovery circuit 2 is updated sequentially from 87.7 MHz to 107.9 MHz through single step increments of 0.2 MHz. and thereafter updated sequentially from 87.6 MHz to 108.0 MHz through the same single step increments of 0.2 MHz. By repeating the operations at step SP32-step SP35, 204 times, the entire frequency band (87.6–108.0 MHz) can be scanned.

If the FM broadcast frequency at which the message service transmits is at 108.0 MHz, a time period of about 102 seconds (=0.5 sec×204) is necessary to complete the fast scan mode.

If the receiving frequency is not determined by the fast scan mode, receiver 70 shifts to a slow scan mode under step SP34. During the slow scan mode, FM receiving circuit 2 intermittently receives messages at about 50-second intervals in scanning the 87.6–108.0 MHz frequency band in determining the FM broadcast frequency being transmitted by the message service.

Once the receiving frequency is determined (step SP33), FM receiving circuit 2 intermittently receives a message each 1.875 minutes to receive a message under step SP36. When operating under step 36, CPU 5 compares the call number included in the transmitted paging data (message) with the personal call number stored in PROM 17 to confirm that the transmitted message is intended for reception by receiver 70 as opposed to one of a plurality of other receiver within system 50.

As now can be readily appreciated, by concurrently switching A-switch 16A, B-switch 16B and C-switch 16C, to their ON state, receiver 70 shifts to a test mode. Once in the test mode, the receiving frequency of FM receiving circuit 2 is initialized to the first test frequency (e.g. 88.1 MHz). This frequency is previously defined at the testing transmitter so that the time required to perform a fast scan is eliminated and the time required to perform a single receiving characteristic test is reduced. To conduct the tests at different frequencies, the receiving frequency of receiver 70 can may be easily changed to a new pre-determined frequency by transmitting a first test packet TP1 including frequency data relating to the new predetermined frequency. Testing of receiver 70 can be carried out at a plurality of different frequencies simply, easily and quickly.

In accordance with the invention, receiver 70 alerts a user of being in the preparatory stage by buzzer 14 producing at least one prolonged warning when a first test packet has been received. A plurality of shorter warnings are alternately produced by buzzer 14 in the main testing stage and indicate reception of a second test packet TP2. In addition count valves N and M are displayed by LCD 12 to provide a simple record of results from testing the receiving characteristics at a particular receiving frequency. Typically, the transmitting interval T2 for the second test packet TP2 is set to 0.5 second which is about half the transmitting interval T1 of the first test packet TP1. A reduction in the time required to perform a single receiving characteristic test results.

Receiver 70 switches to the preparatory stage after repeating the receiving operation for second test packets during the main testing stage ninety-nine (99) times. FM receiving circuit 2 is forced to enter the power-off mode if a first test packet is not received for approximately 2 minutes during the preparatory stage. Therefore, after completion of a test, the supply of power from battery 40 to FM receiving circuit 2 is automatically turned OFF. The useful life of internal battery 40 is not shortened even if the paging receiver 70 is left unattended during testing permitting a person conducting the test to attend to another task. Since time and labor in manually turning OFF the power supply is eliminated, the test may proceed smoothly and promotes a reduction in production costs.

Receiver 70 also can significantly reduce power consumption by FM receiving circuit 2. The power consumed in the power-on mode by FM receiving circuit 2 can approach several tens of mA, the maximum allowable current value. The current consumed by receiving circuit 2 in the power-save mode, however, is of the order of several tens of μA. Receiver 70 therefore advantageously operates in the power save mode as much as possible. Receiver 70 also avoids unnecessary consumption, prolonging the life of battery 70 by automatically switching to the power-off mode when a first test packet TP1 has not been received for about two minutes.

By CPU 5 initializing FM receiving circuit 2 at a predetermined frequency based on test packet TP1, the time normally required by a conventional paging device to scan and determine the transmittal test frequency is eliminated. The time required to perform the receiving characteristic test is therefore shortened. The time required to test and adjust the components of receiver 70 can proceed in an efficient manner, especially when the receiving characteristic test is to be repeated for different environmental conditions. The labor and time required to conduct these tests and accompanying adjustments of receiver 70 components can be sharply reduced.

It will thus be seen that the objects set forth above, among those made apparent from the preceding description, are efficiently attained and, since certain changes may be made in the above method and constructions without departing from the spirit and scope of the invention, it is intended that all matter contained in the above method and description and shown in the accompanying drawings shall be interpreted as illustrative and not in a limiting sense.

It is also to be understood that the following claims ar intended to cover all of the generic and specific features of the invention herein described and all statements of the scope of the invention which, as a matter of language, might be said to fall therebetween.

What is claimed is:

1. A paging device for receiving information and including a test mode for determining the receiving characteristics of the device and a scan mode for scanning a frequency range within which said information exists in determining the frequency of the information, comprising:
   receiving means for receiving said information at a receiving frequency, said receiving means operable for being set at different receiving frequencies;
   control means for setting said frequency of said receiving means during said test mode to a predefined test frequency, said predefined test frequency being determined by said control means without said device entering said scan mode; and
   means coupled to said control means for conserving energy consumption of said paging device during said test mode.

2. The paging device of claim 1, further including wireless transmitter means for producing said information.

3. The paging device of claim 1, further including switching means for initiating said test mode.

4. The paging device of claim 3, wherein said control means in response to said switching means shifts said receiving means to said test mode.

5. The paging device of claim 1, further including warning means for producing at least two different warnings.

6. The paging device of claim 1, wherein said information includes a first test packet including frequency data corresponding to said predefined test frequency.

7. The paging device of claim 6, further including storage means for storing identification data for identifying said first test packet.

8. The paging device of claim 7, wherein said control means is operable for detecting said first test packet during said test mode based on said identification data of said storage means.

9. The paging device of claim 8, wherein said test mode includes a preparatory stage during which said control means sets said receiving frequency of said receiving means to said predefined test frequency corresponding to frequency data of said first test packet.

10. The paging device of claim 9, further including warning means for producing at least two different warnings.

11. The paging device of claim 10, wherein said warning means produces in response to said control means detecting said first test packet a first of said at least two different warnings representing detection of said first test packet during said preparatory stage of said test mode.

12. The paging device of claim 11, further including a wireless transmitter means for producing said information.

13. The paging device of claim 12, wherein said transmitter means is operable for adjusting the frequency data of said first test packet so as to correspond to an additional predefined frequency within said frequency range which serves as said predefined test frequency.

14. The paging device of claim 13, wherein said information includes a second test packet at said predefined test frequency.

15. The paging device of claim 14, wherein said storage means is operable for storing additional identification data for identifying said second test packet.

16. The paging device of claim 15, wherein said control means is operable for detecting said second test packet based on said additional identification data stored in said storage means.

17. The paging device of claim 16, wherein said test mode includes a main testing stage, said control means is operable for shifting said device to said main testing stage following setting of said receiving frequency at said predefined test frequency and prior to detection of said second test packet by said control means.

18. The paging device of claim 17, wherein said warning means produces in response to said control mean detecting said second test packet a second of said at least two different warning representing detection of said second test packet during said main testing stage of said test mode.

19. The paging device of claim 18, wherein said control means is operable for suspending said receiving operation of said receiving means for a prefixed period of time during said preparatory stage of said test mode.

20. The paging device of claim 19, wherein said control means during said prefixed period of time is operable for changing the receiving frequency at which said receiving means is set.

21. The paging device of claim 20, wherein said control means is operable for shifting from said main testing stage back to said preparatory stage in response to said control means detecting said first test packet during said main testing stage.

22. The paging device of claim 21, wherein said control means upon detecting said first test packet during said main testing stage is operable for suspending said receiving operation of said receiving means for an additional prefixed period of time.

23. The paging device of claim 22, wherein said prefixed period of time and said additional prefixed period of time ar the same.

24. The paging device of claim 22, further including additional control means, said receiving means responsive to said additional control means for receiving said information.

25. The paging device of claim 24, wherein said receiving means based on said additional control means intermittently operates for a first time interval during the preparatory stage and intermittently operates for a second intermittent time interval during the main testing stage.

26. The paging device of claim 25, wherein said second intermittent time interval is shorter than said first intermittent time interval.

27. The paging device of claim 25, further including display means for displaying values representing the receiving characteristics determined during s id test mode.

28. The paging device of claim 27, wherein the values include the number of times said receiving means attempts to receive said second test packet and the number of times said receiving means receives said second test packet during said main testing stage.

29. The paging device of claim 26, further including display means for displaying values representing the receiving characteristics determined during said test mode.

30. The paging device of claim 29, wherein the values include the number of times said receiving means attempts to receive said second test packet and the number of times said receiving means receives said second test packet during said main testing stage.

31. The paging device of claim 27, wherein at least said receiving operation of said receiving means is halted in the absence of a first test packet being detected by said control means within a preset time interval of said preparatory stage.

32. The paging device of claim 31, wherein said display means is operable for displaying different operational modes of said device.

33. The paging device of claim 1, wherein said range of frequencies is between about 87.6 MHz to about 108.0 MHz.

34. The paging device of claim 2, further including switching means for initiating said test mode.

35. The paging device of claim 34, wherein said control means in response to said switching means shifts said receiving means to said test mode.

36. The paging device of claim 4, further including warning means for producing at least two different warnings.

37. The paging device of claim 35, further including warning means for producing at least two different warnings.

38. The paging device of claim 4, wherein said information includes a first test packet including frequency data corresponding to said predefined test frequency.

39. The paging device of claim 38, further including storage means for storing identification data for identifying said first test packet.

40. The paging device of claim 39, wherein said control means is operable for detecting said first test packet during said test mode based on said identification data of said storage means.

41. The paging device of claim 40, wherein said test mode includes a preparatory stage during which said control means sets said receiving frequency of said receiving means to said predefined test frequency corresponding to frequency data of said first test packet.

42. The paging device of claim 38, wherein said transmitter means is operable for adjusting the frequency data of said first test packet so as to correspond to a new frequency within said frequency range which serves as said predefined test frequency.

43. The paging device of claim 42, wherein said information includes a second test packet at said predefined test frequency.

44. The paging device of claim 43, wherein said storage means is operable for storing additional identification data for identifying said second test packet.

45. The paging device of claim 44, wherein said control means is operable for detecting said second test packet based on said additional identification data stored in said storage means 46. The paging device of claim 45, wherein said test mode includes a main testing stage, said control means is operable for shifting said device to said main testing stage following setting of said receiving frequency at said predefined test frequency and prior to detection of said second test packet by said control means.

47. The paging device of claim 14, wherein said warning means produces in response to said control means detecting said second test packet a second of said at least two different warnings representing detection of said second test packet during said main testing stage of said test mode.

48. The paging device of claim 47, wherein said control means is operable for suspending said receiving operation of said receiving means for a prefixed period of time during said preparatory stage of said test mode.

49. The paging device of claim 48, wherein said control " means during said prefixed period of time is operable for changing the receiving frequency at which said receiving means is set.

50. The paging device of claim 49, wherein said control means is operable for shifting from said main testing stage back to said preparatory stage in response to said control means detecting said first test packet during said main testing stage.

51. The paging device of claim 17, wherein said receiving mean is operable for operating during first intermittent time intervals of said preparatory stage and for operating during second intermittent time intervals of said main testing stage, each second intermittent time interval being shorter than each first intermittent time interval.

52. The paging device of claim 1, further including display means for displaying values representing the receiving characteristics determined during said test mode.

53. The paging device of claim 17, further including display means for displaying values representing the receiving characteristics determined during said test mode.

54. The paging device of claim 53, wherein the values include the number of times said receiving means attempts to receive said second test packet and the number of times said receiving means receives said second test packet during said main testing stage.

55. The paging device of claim 9, wherein operation of said receiving means is suspended in the absence of a first test packet being detected by said control means within a preset time interval of said preparatory stage.

56. The paging device of claim 17, wherein operation of said receiving means is suspended in the absence of a first test packet being detected by said control means within a preset time interval of said preparatory stage.

57. A method for testing the receiving characteristics of a paging device, said device operable for receiving information during at least a test mode and a scanning mode and including receiver means for receiving said information and control means for controlling said receiver means wherein during said test mode said receiving characteristics are tested and during said scan mode a frequency range is scanned within which said information exists in determining the frequency of the information, comprising the steps of:

receiving at said receiving means during a preparatory stage of said test mode a first test packet of information including frequency data corresponding to a predefined test frequency;

determining the frequency of said predefined test frequency without entering said scan mode;

setting a receiving frequency of said receiver means for receiving information at said predefined test frequency;

receiving at said receiving means during a main testing stage of said test mode at least one second test packet of information at said predefined test frequency following setting of said receiving frequency at said predefined test frequency;

processing said at least one second test packet of information to determine said receiving characteristics; and conserving energy consumption of said paging device during said test mode.

58. The method of claim 57, further including producing at least two different warnings representing reception by said receiver means of said first test packet during said preparatory stage and of said second test packet during said main testing stage.

59. The method of claim 58, including storing identification data for identifying said first test packet and said second test packet.

60. The method of claim 59, further including detecting by said control means during said test mode reception of said first test packet and said second test packet based on said identification data.

61. The method of claim 60, further including shifting from said preparatory stage to said main testing stage upon reception of said first test packet.

62. The method of claim 61, further including suspending said receiver operation of said receiving means for a prefixed period of time during said preparatory stage for changing the receiving frequency at which said receiving means is set.

63. The method of claim 62, further including shifting from said main testing stage back to said preparatory stage in response to said control means detecting said first test packet during said main testing stage.

64. The method of claim 63, further including suspending said receiver operation of said receiving means for an additional prefixed period of time upon detection of said first test packet during said main testing stage.

65. The method of claim 57, further including operating said receiving mean during first intermittent time intervals of said preparatory stage and during second intermittent time intervals of said main testing stage, each second intermittent time interval being shorter than each first intermittent time interval.

66. The method of claim 60, further including operating said receiving means during first intermittent time intervals of said preparatory stage and during second intermittent time intervals of said main testing stage, each second intermittent time interval being shorter than each first intermittent time interval.

67. The method of claim 64, further including operating said receiving means during first intermittent time intervals of said preparatory stage and during second intermittent time intervals of said main testing stage, each second intermittent time interval being shorter than each first intermittent time interval.

* * * * *